Nov. 19, 1929.  F. P. ROESCH  1,736,174
CRANK PIN LUBRICATOR
Filed Dec. 7, 1922
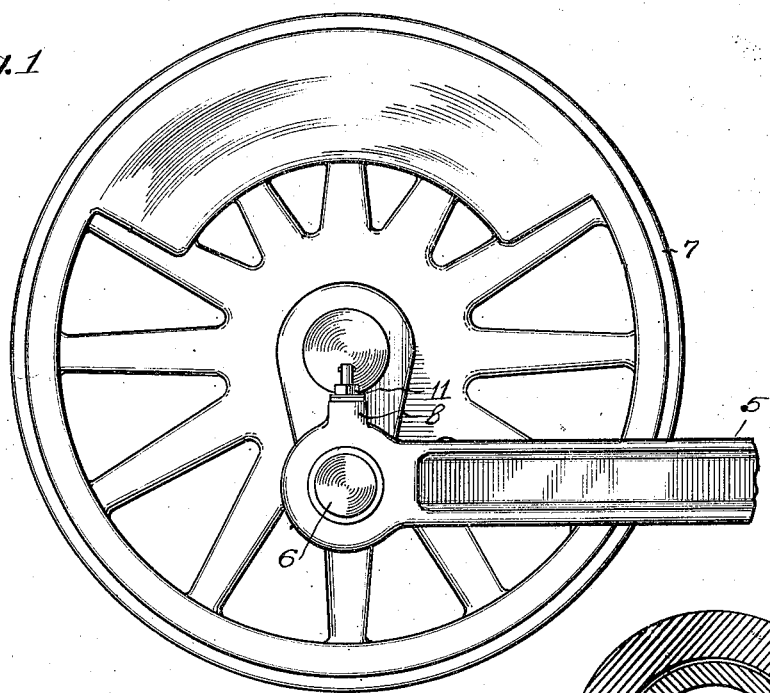
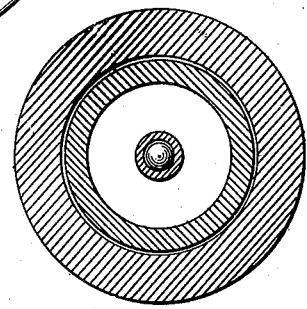
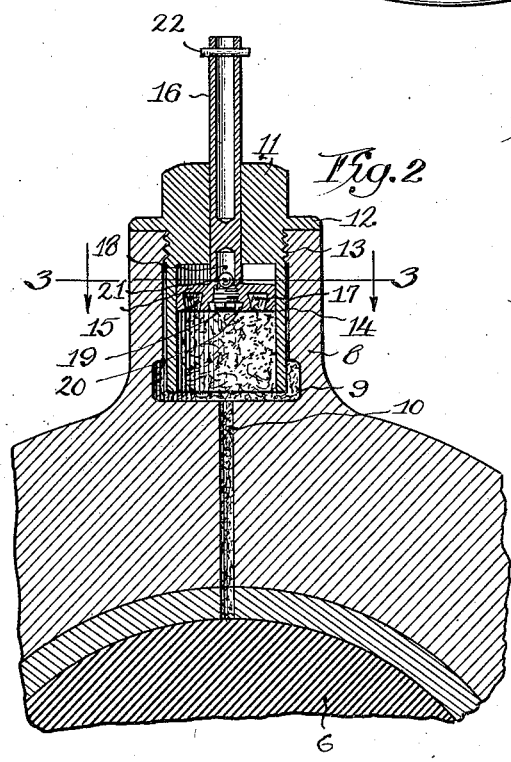
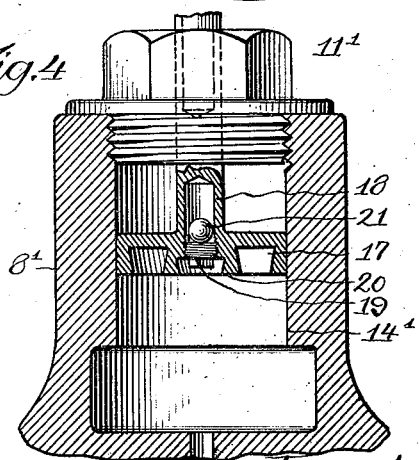
Inventor,
Frank P. Roesch
By Fred Gerlach, Atty.

Patented Nov. 19, 1929

1,736,174

UNITED STATES PATENT OFFICE

FRANK P. ROESCH, OF CHICAGO, ILLINOIS, ASSIGNOR TO HARRY VISSERING AND COMPANY, OF CHICAGO, ILLINOIS, A CORPORATION OF ILLINOIS

CRANK-PIN LUBRICATOR

Application filed December 7, 1922. Serial No. 605,388.

The present invention relates generally to crank-pin lubricators for use in connection with locomotives and other such mechanisms, and more particularly to that type of lubricator which embodies a slidable piston having a weight therein movable up and down by the rotation of the crank-pin and operable during such movement to tap the piston against the grease so as to feed the latter to the crank-pin bearing.

The object of the invention is to provide a lubricator of the aforementioned character, which is of new and improved construction, and in which the face of the piston adjacent the grease embodies an undercut cavity operative to receive a portion of the grease so as to lock the same therein and cause the piston to adhere to the main body of the grease during the rotation of the crank-pin.

Other objects and the various advantages and characteristics of the present lubricator construction will be apparent from a consideration of the following detailed description.

The invention consists in the several novel features hereinafter set forth and more particularly defined by the claims at the conclusion hereof.

In the drawing which accompanies and forms a part of this specification or disclosure and in which like numerals of reference denote corresponding parts throughout the several views: Fig. 1 is a side elevation showing the invention applied to a drive-wheel of a locomotive. Fig. 2 is a vertical section through the lubricator and crank-pin. Fig. 3 is a transverse section taken on the line 3—3 of Fig. 2. Fig. 4 is a vertical section showing a modification of the invention.

The invention is exemplified as applied to the connecting rod 5 which is pivotally connected to the crank-pin 6 of a locomotive-wheel 7. The rod is provided with an upwardly extending boss 8 in which a chamber 9 is formed for the grease used to lubricate the crank-pin 6. The chamber 9 is connected to the bearing for the crank-pin by a duct 10. A cap or plug 11 is provided with a flange 12 to seat on the upper or outer end of boss 8, is screw-threaded to the boss, as at 13, is adapted to close the upper end of the chamber in the boss and is extended inwardly or downwardly to form a cylinder 14. A plunger or piston 15 is slidably held in and substantially fits in the cylinder 14. A stem 16 on the plunger extends through and is adapted to slide in cap 11, so that the outer end of the stem will be accessible at all times. The lower or inner face of plunger 14 is provided with an annular undercut channel 17 into which the grease will be forced. The channel 17 is undercut or convergent towards the grease in cylinder 14 to cause the grease to adhere to the plunger and retard the outward or upward movement thereof. A cavity or pocket 18 is formed in the lower end of the plunger, the top of which is closed and the lower end of which is closed by a screw plug 19. The head of plug 19 is disposed in an undercut pocket 20 which causes additional retardation by the grease to the upward movement of the plunger. A ball or weight 21 is confined in cavity 18 and is movable vertically therein between plug 19 and the top of the cavity. A pin 22 passes through the upper end of stem 16 to enable the operator to pull the piston upwardly in cylinder 14 when desired.

The operation of the lubricating device is as follows: The chamber 9 is filled with grease and the cap 11 is then forced down to close the chamber to force the grease into channel 17 and pocket 20 and simultaneously put sufficient initial pressure on the grease to feed it through duct 10 for initial lubrication of the crank pin. At this time, the plunger 15 will be held in the upper end of cylinder 9. When the locomotive starts and the drive wheels begin to revolve, centrifugal force caused by the rotation of the crank-pin will cause the ball 21 to alternately rise and fall in cavity 18. That is, when the crankpin is below the wheel axis, centrifugal force will cause the ball to tap and bear against the plug 19, thus exerting a pressure upon the plunger to compact the grease in chamber 9, and when the ball is passing over the center of the wheel axis, centrifugal force will cause it to rise in cavity 18. The outward movement of the plunger will be resisted by adhesion of the grease in and below the plunger, so that the ball will deliver a light blow or tap to the screw-plug 19 to force the plunger downwardly in cylinder 14. This tapping will cause the grease to be forced automatically and supplied to the crank pin during the operation of the locomotive. When the locomotive is stopped, the forcing of the grease to the crank pin automatically ceases. By adjusting screw plug 19 inwardly or outwardly, the force of the tap or blow produced by the ball may be varied as desired.

In the modification shown in Fig. 4, the plunger 15 operates directly in the cylindrical wall 14' of the boss 8', in lieu of operating in a cylinder on the cap. In this modification, the cylindrical wall is omitted from the cap 11'. In practice, the plunger is usually formed of light metal, such as aluminum, and the outer end of the plunger stem is drilled or bored away to decrease its weight.

The invention exemplifies a lubricating device for crank-pins, in which the pressure upon the grease is controlled by the rotation of the crank-pin or wheel by which it is carried, so that the pressure will automatically cease when the crank-pin is stationary and will be continued as long as it is revolving. Furthermore, the rapidity with which the tapping device is operated increases with the speed of the locomotive, so that the amount of grease fed to the crank-pin is automatically varied in accordance with the working requirements. In starting, the engineer can push the stem 16 inwardly to lubricate initially the crank-pin whenever desired.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lubricating device for a crank-pin bearing, the combination of a grease receptacle, a piston for feeding the grease, mounted to slide longitudinally in the receptacle, means operative during rotation of the crank-pin to force automatically the piston against the grease, said piston having in the face thereof which is contiguous to the grease, a cavity into which a portion of the grease is forced, the side walls of the cavity converging towards the grease in the receptacle to lock said portion of the grease in the cavity so that the piston adheres to the grease and is prevented from separating therefrom during rotation of the crank-pin.

2. In a lubricating device for a crank-pin bearing, the combination of a grease receptacle, a piston disposed in said receptacle for feeding the grease, a stem extending upwardly from said piston, the piston being provided with a chamber extending upwardly into the stem, and a weight in the chamber movable vertically by the rotation of the crank-pin, the under side of the piston being provided with an annular cavity having its walls converging toward the grease in the receptacle and into which a portion of the grease will be forced to cause the piston to adhere to the grease in the receptacle during rotation of the pin.

Signed at Chicago, Illinois this 18th day of November, 1922.

FRANK P. ROESCH.